(12) United States Patent
Okamoto et al.

(10) Patent No.: US 11,680,926 B2
(45) Date of Patent: Jun. 20, 2023

(54) GAS SENSOR

(71) Applicant: NGK INSULATORS, LTD., Aichi (JP)

(72) Inventors: Taku Okamoto, Nagoya (JP); Yuichiro Kondo, Obu (JP); Osamu Nakasone, Inabe (JP)

(73) Assignee: NGK INSULATORS, LTD., Nagoya (JP)

( * ) Notice: Subject to any disclaimer, the term of this patent is extended or adjusted under 35 U.S.C. 154(b) by 144 days.

(21) Appl. No.: 17/170,940

(22) Filed: Feb. 9, 2021

(65) Prior Publication Data

US 2021/0270768 A1 Sep. 2, 2021

(30) Foreign Application Priority Data

Mar. 2, 2020 (JP) .............................. JP2020-035160

(51) Int. Cl.
*G01N 27/41* (2006.01)
*G01N 27/406* (2006.01)

(52) U.S. Cl.
CPC ......... *G01N 27/41* (2013.01); *G01N 27/4062* (2013.01); *G01N 27/4065* (2013.01); *G01N 27/4067* (2013.01)

(58) Field of Classification Search
CPC .... G01N 27/41; G01N 27/4067; G01N 27/27; G01N 27/406–4065; G01N 27/407–4071; G01N 27/409; G01N 27/417; G01N 27/419; G01N 27/48
See application file for complete search history.

(56) References Cited

U.S. PATENT DOCUMENTS

| 4,419,213 A * | 12/1983 | Oshima .............. G01N 27/4071 204/426 |
| 4,909,922 A * | 3/1990 | Kato .................. G01N 27/4072 204/406 |
| 5,976,335 A * | 11/1999 | Kato .................. G01N 27/4065 204/426 |
| 2009/0107839 A1* | 4/2009 | Scheffel ............. G01N 27/4067 204/406 |
| 2018/0284053 A1 | 10/2018 | Watanabe et al. |

FOREIGN PATENT DOCUMENTS

JP 2018-173320 A 11/2018
WO WO-2012007200 A1 * 1/2012 ........... G01N 27/419

\* cited by examiner

*Primary Examiner* — Joshua L Allen
*Assistant Examiner* — Vivian A Tran
(74) *Attorney, Agent, or Firm* — Mattingly & Malur, PC

(57) ABSTRACT

A gas sensor includes a sensor element including an element body, a first electrode, a second electrode, and a heater; a voltage acquisition section that acquires a voltage between the first electrode and the second electrode; a heater power supply; an external common lead that serves as both at least part of an electric circuit used to acquire the voltage by providing electrical continuity between the first electrode and the voltage acquisition section and at least part of an electric circuit used to supply an electric power from the heater power supply to the heater and that is disposed outside the sensor element; and a correction section that derives a value of a voltage drop in the external common lead in accordance with a heater current and that corrects the voltage acquired by the voltage acquisition section in accordance with the derived value of the voltage drop.

6 Claims, 6 Drawing Sheets

GAS SENSOR

CROSS-REFERENCE TO RELATED APPLICATION

The present application claims priority from Japanese Patent Application No. 2020-035160, filed on Mar. 2, 2020, the entire contents of which are incorporated herein by reference.

BACKGROUND OF THE INVENTION

1. Field of the Invention

The present invention relates to a gas sensor.

2. Description of the Related Art

Hitherto, a gas sensor that detects the concentration of a specific gas, such as NOx, in a measurement-object gas, such as the exhaust gas of an automobile, is known. For example, PTL 1 describes a gas sensor including a sensor element in which a plurality of oxygen-ion-conductive solid electrolyte layers is laminated, a reference electrode formed inside the sensor element and into which a reference gas (for example, the atmosphere) is introduced from a reference gas inlet space, a measurement electrode disposed in a measurement-object gas flow portion inside the sensor element, a measurement-object gas-side electrode disposed at a part exposed to measurement-object gas in the sensor element, and a heater that adjusts the sensor element to a temperature at which the solid electrolyte layers are activated. In this gas sensor, the electrodes in the sensor element and an external power supply are connected via lead wires formed in the sensor element and lead wires connected to the outside of the sensor element.

CITATION LIST

Patent Literature

PTL 1: JP 2018-173320 A

SUMMARY OF THE INVENTION

Incidentally, it has been desired to reduce the number of leads in a gas sensor. Therefore, the present inventors conceived to reduce the number of leads by integrating a lead for measuring the voltage between two electrodes in a sensor element with a lead for energizing a heater. However, if the leads are integrated in this way, it has been found that the accuracy of measuring the voltage between two electrodes decreases.

The present invention is intended to solve such a problem, and it is a main object to improve the voltage measurement accuracy when leads are integrated.

The present invention employs the following manner to achieve the above-described main object.

A gas sensor of the present invention includes:

a sensor element including an element body having an oxygen-ion-conductive solid electrolyte layer, a first electrode disposed on or in the element body, a second electrode disposed on or in the element body, and a heater disposed on or in the element body;

a voltage acquisition section that acquires a voltage between the first electrode and the second electrode;

a heater power supply that supplies an electric power to the heater;

an external common lead that serves as both at least part of an electric circuit used to acquire the voltage by providing electrical continuity between the first electrode and the voltage acquisition section and at least part of an electric circuit used to supply an electric power from the heater power supply to the heater and that is disposed outside the sensor element; and a correction section that derives a value of a voltage drop in the external common lead in accordance with a heater current flowing through the heater and that corrects the voltage acquired by the voltage acquisition section in accordance with the derived value of the voltage drop.

In the gas sensor, a value of a voltage drop in the external common lead is derived in accordance with a heater current flowing through the heater, and the voltage acquired by the voltage acquisition section is corrected in accordance with the derived value of the voltage drop. Since the external common lead serves as both at least part of an electric circuit used to acquire a voltage and at least part of an electric circuit used to supply an electric power to the heater, the acquired voltage contains a value of a voltage drop due to a heater current flowing through the external common lead. Then, a value of a voltage drop is derived in accordance with a heater current, and a voltage acquired by the voltage acquisition section is corrected in accordance with the value of the voltage drop. Thus, the measurement accuracy of the voltage between the first electrode and the second electrode improves.

In this case, the correction section may derive a value obtained by subtracting the value of the voltage drop from the voltage acquired by the voltage acquisition section, as a corrected voltage. The gas sensor of the present invention may include a heater current acquisition section that acquires the heater current, and the correction section may derive a value of a voltage drop in the external common lead by using the heater current acquired by the heater current acquisition section.

In the gas sensor of the present invention, the correction section may derive a value of a voltage drop in the external common lead in accordance with a heater current flowing through the heater, and a length of the external common lead. With this configuration, it is possible to highly accurately derive a value of a voltage drop by considering not only the heater current but also the length of the external common lead, so the voltage measurement accuracy further improves. The length of the external common lead may be, for example, stored in advance in a storage section of the gas sensor.

In the gas sensor of the present invention, the correction section may derive a value of a voltage drop in the external common lead in accordance with a heater current flowing through the heater, and a temperature of the external common lead. A resistance value of the external common lead also varies depending on a temperature and, accordingly, a value of a voltage drop also varies. Therefore, it is possible to further accurately derive a value of a voltage drop by considering not only the heater current but also the temperature of the external common lead, so the voltage measurement accuracy further improves. In this case, the correction section may acquire a temperature detected by a temperature sensor provided separately from the gas sensor, derive a temperature of the external common lead in accordance with the acquired temperature, and derive a value of a voltage drop in the external common lead in accordance with the derived temperature.

The gas sensor of the present invention may further include an internal common lead that serves as both at least part of an electric circuit used to acquire the voltage by providing electrical continuity between the first electrode and the voltage acquisition section and at least part of an electric circuit used to supply an electric power from the heater power supply to the heater and that is disposed inside the sensor element, and a common terminal disposed outside the element body and connected to the internal common lead, the common terminal being a terminal for connecting the sensor element to a device outside the sensor element. In this way, by providing the sensor element with the internal common lead and the common terminal, it is possible to reduce the number of leads and terminals disposed on or in the element body.

In the gas sensor of the present invention, one of the first electrode and the second electrode may be disposed on or in the element body so as to contact with a measurement-object gas and the other one of the first electrode and the second electrode may be disposed on or in the element body so as to contact with a reference gas that is a reference for detecting an oxygen concentration, and the gas sensor may further include an oxygen concentration detection section that detects an oxygen concentration in the measurement-object gas in accordance with a voltage corrected by the correction section. With this gas sensor, since one of the first electrode and the second electrode is disposed so as to contact with a measurement-object gas and the other one of the first electrode and the second electrode is disposed so as to contact with a reference gas, the voltage between the first electrode and the second electrode becomes a value based on a difference in oxygen concentration between the measurement-object gas and the reference gas. Therefore, it is possible to detect the oxygen concentration in the measurement-object gas in accordance with the voltage. Since the oxygen concentration in the measurement-object gas is detected by using a corrected voltage, the measurement accuracy of the oxygen concentration improves.

In the gas sensor of the present invention in the embodiment including the oxygen concentration detection section, a measurement-object gas flow portion that introduces the measurement-object gas into the element body and flows the measurement-object gas may be provided inside the element body, the first electrode may be an outer electrode provided outside the element body, the second electrode may be a reference electrode provided inside the element body, the sensor element may include a preliminary pump electrode, a main pump electrode, and an auxiliary pump electrode disposed in this order from an upstream side in the measurement-object gas flow portion, a measurement electrode disposed in a measurement chamber provided downstream of the auxiliary pump electrode within the measurement-object gas flow portion, and a reference gas inlet portion that introduces the reference gas and flows the reference gas to the reference electrode, and the gas sensor may further include an oxygen concentration adjustment section that adjusts an oxygen concentration in the measurement-object gas flow portion by applying a control voltage between the preliminary pump electrode and the outer electrode, between the main pump electrode and the outer electrode, and between the auxiliary pump electrode and the outer electrode, respectively; a measurement voltage detection section that detects a measurement voltage between the reference electrode and the measurement electrode; and a specific gas concentration detection section that acquires a detected value corresponding to oxygen produced from a specific gas in the measurement-object gas in the measurement chamber in accordance with the measurement voltage and detects a specific gas concentration in the measurement-object gas in accordance with the detected value. With this gas sensor, the oxygen concentration in the measurement-object gas introduced into the measurement-object gas flow portion is adjusted by the oxygen concentration adjustment section, and the adjusted measurement-object gas reaches the measurement chamber. The gas sensor acquires a detected value corresponding to oxygen produced from a specific gas in the measurement chamber in accordance with the measurement voltage and detects a specific gas concentration in the measurement-object gas in accordance with the detected value. Therefore, with this gas sensor, it is possible to detect both a specific gas concentration and an oxygen concentration in a measurement-object gas. The sensor element of the gas sensor includes the plurality of electrodes and the heater and needs a plurality of leads used to connect each of them to a device outside the sensor element, while it is possible to reduce the number of leads by providing part of electric circuits as the above-described external common lead. In this case, the sensor element may include the above-described internal common lead and a common terminal. When the sensor element includes a plurality of electrodes, the number of terminals also increases, so it is significant to reduce the number of terminals by providing a common terminal.

DETAILED DESCRIPTION OF THE INVENTION

Figure 1:
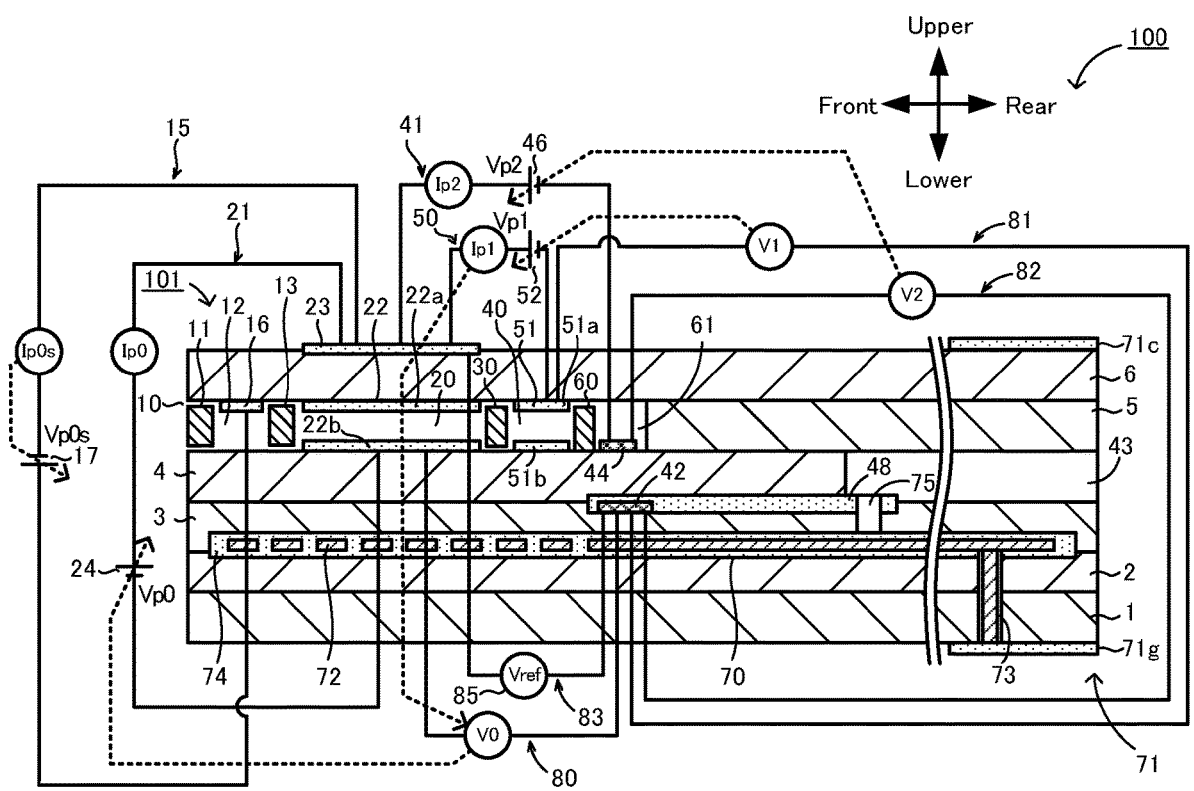
FIG. 1 is a schematic cross-sectional view of a gas sensor 100.
Figure 2:
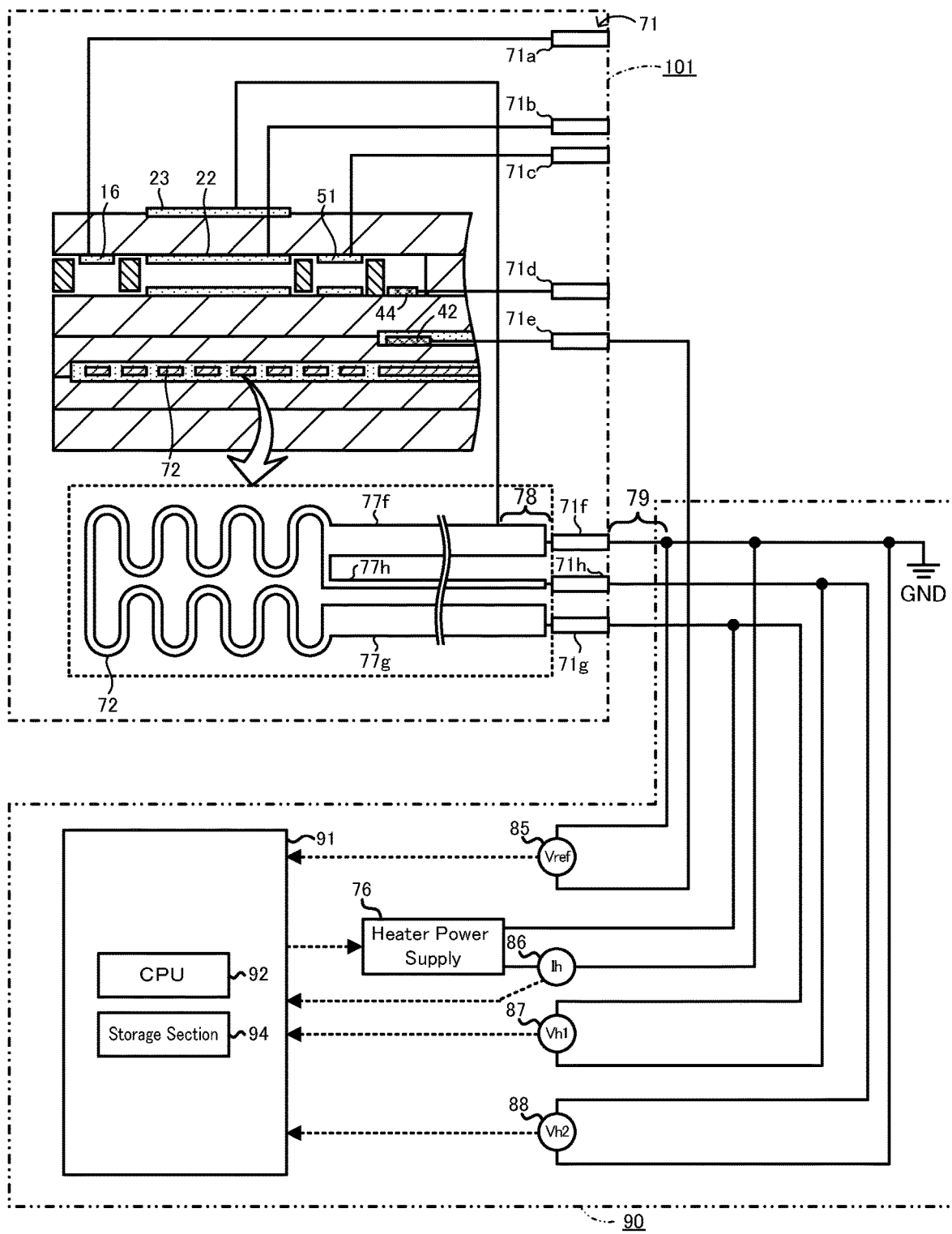
FIG. 2 is a schematic diagram showing the inside of a sensor element 101, the inside of a control apparatus 90, and wires between the sensor element 101 and the control apparatus 90.
Figure 3:
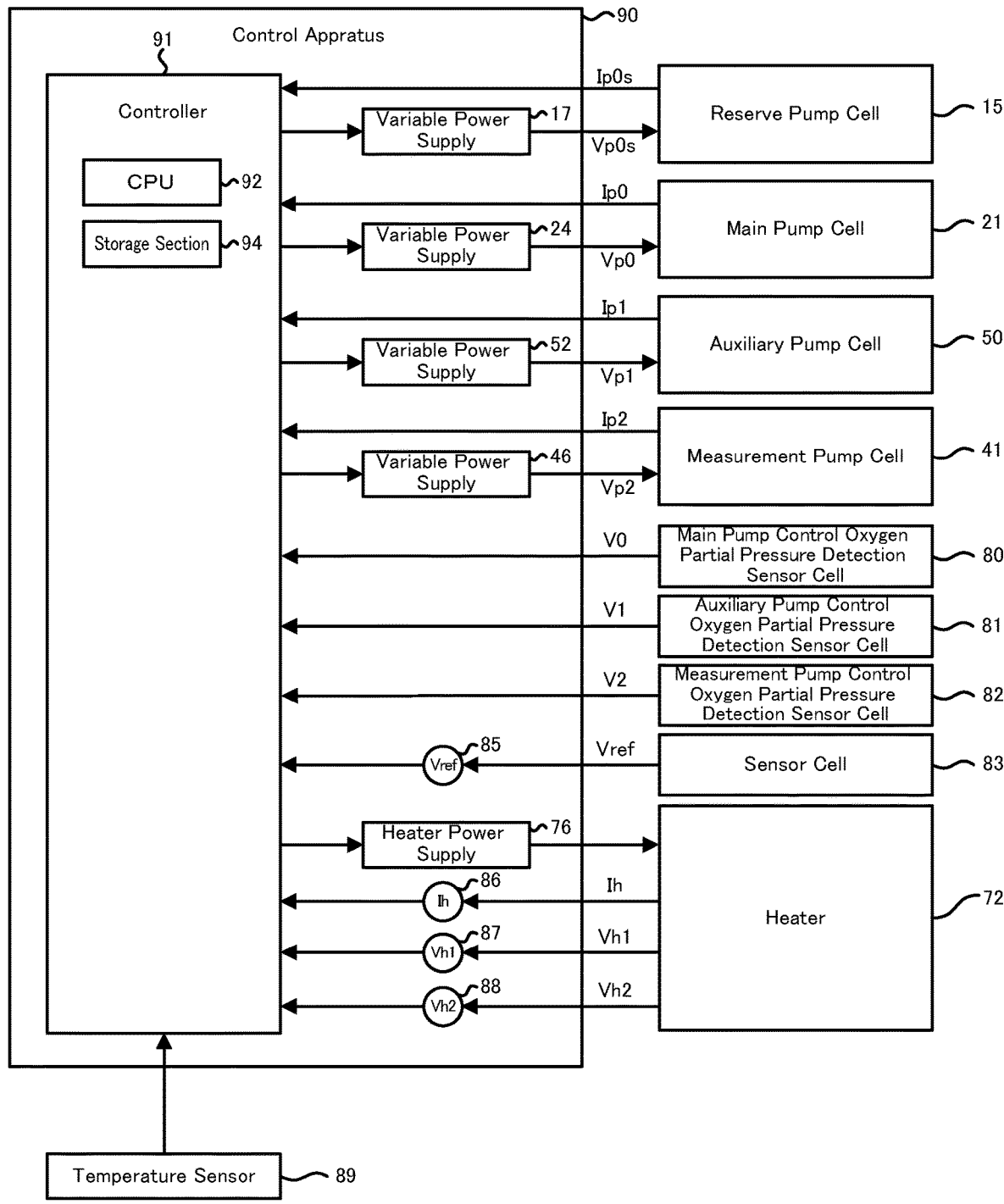
FIG. 3 is a block diagram showing an electrical connection relation between the control apparatus 90 and each of cells and a heater 72.

Next, an embodiment of the present invention will be described with reference to the drawings. FIG. 1 is a schematic cross-sectional view schematically showing an example of the configuration of a gas sensor 100 that is one embodiment of the present invention. FIG. 2 is a schematic diagram showing the inside of a sensor element 101, the inside of a control apparats 90, and wires between the sensor element 101 and the control apparatus 90. FIG. 3 is a block diagram showing an electrical connection relation between the control apparatus 90 and each of cells and a heater 72. The gas sensor 100 is, for example, installed in a pipe, such as an exhaust gas pipe of an internal combustion engine, such as a gasoline engine and a diesel engine. The gas sensor 100 uses the exhaust gas from the internal combustion engine as a measurement-object gas and detects the concentration of a specific gas, such as NOx and ammonia, in the measurement-object gas. In the present embodiment, the gas sensor 100 is configured to measure a NOx concentration as a specific gas concentration. The gas sensor 100 includes a long rectangular parallelepiped sensor element 101, cells 15, 21, 41, 50, 80 to 83 each made up of part of the sensor element 101, a heater portion 70 provided inside the sensor element 101, and the control apparatus 90 that controls the overall gas sensor 100.

The sensor element 101 is an element having a layered body in which six layers, that is, a first substrate layer 1, a second substrate layer 2, a third substrate layer 3, a first solid electrolyte layer 4, a spacer layer 5, and a second solid electrolyte layer 6, each made up of an oxygen-ion-conductive solid electrolyte layer made of zirconia ($ZrO_2$) or the like, are laminated in this order from a lower side in the drawing. The solid electrolyte forming these six layers is a dense, airtight one. The sensor element 101 is manufactured by, for example, applying predetermined processing, printing of a circuit pattern, and the like on a ceramic green sheet corresponding to each layer, then laminating those sheets, and further firing the sheets to be integrated.

At a tip end portion side of the sensor element 101 (left end portion side in FIG. 1), a gas inlet port 10, a first diffusion controlled portion 11, a buffer space 12, a second diffusion controlled portion 13, a first internal cavity 20, a third diffusion controlled portion 30, a second internal cavity 40, a fourth diffusion controlled portion 60, and a third internal cavity 61 are formed adjacent to each other so as to communicate with each other in this order between the under surface of the second solid electrolyte layer 6 and the top surface of the first solid electrolyte layer 4.

The gas inlet port 10, the buffer space 12, the first internal cavity 20, the second internal cavity 40, and the third internal cavity 61 are spaces of which top parts, bottom parts, and side parts, provided by hollowing the spacer layer 5, are respectively defined by the under surface of the second solid electrolyte layer 6, the top surface of the first solid electrolyte layer 4, and the side surface of the spacer layer 5 inside the sensor element 101.

Each of the first diffusion controlled portion 11, the second diffusion controlled portion 13, and the third diffusion controlled portion 30 is provided as two laterally long slits (openings of which the longitudinal direction is a direction perpendicular to the drawing). The fourth diffusion controlled portion 60 is provided as a single laterally long slit (an opening of which the longitudinal direction is a direction perpendicular to the drawing) formed as a clearance from the under surface of the second solid electrolyte layer 6. A part from the gas inlet port 10 to the third internal cavity 61 is also referred to as measurement-object gas flow portion.

At a location farther from the tip end side than the measurement-object gas flow portion, a reference gas inlet space 43 is provided between the top surface of the third substrate layer 3 and the under surface of the spacer layer 5 at a location at which the side part is defined by the side surface of the first solid electrolyte layer 4. For example, the atmosphere is introduced into the reference gas inlet space 43 as a reference gas at the time of measuring a NOx concentration.

An atmosphere inlet layer 48 is a layer made of porous ceramics. The reference gas is introduced into the atmosphere inlet layer 48 through the reference gas inlet space 43. The atmosphere inlet layer 48 is formed so as to coat the reference electrode 42.

The reference electrode 42 is an electrode formed in such a manner in which the reference electrode 42 is sandwiched by the top surface of the third substrate layer 3 and the first solid electrolyte layer 4. As described above, the atmosphere inlet layer 48 that communicates with the reference gas inlet space 43 is provided around the reference electrode 42. As will be described later, it is possible to measure an oxygen concentration (oxygen partial pressure) in the first internal cavity 20, an oxygen concentration (oxygen partial pressure) in the second internal cavity 40, and an oxygen concentration (oxygen partial pressure) in the third internal cavity 61 by using the reference electrode 42. The reference electrode 42 is formed as a porous cermet electrode (for example, a cermet electrode of Pt and $ZrO_2$).

In the measurement-object gas flow portion, the gas inlet port 10 is a portion that is open to an external space, and a measurement-object gas is taken into the sensor element 101 from the external space through the gas inlet port 10. The first diffusion controlled portion 11 is a portion that applies predetermined diffusion resistance to a measurement-object gas taken in through the gas inlet port 10. The buffer space 12 is a space provided to guide the measurement-object gas introduced from the first diffusion controlled portion 11 to the second diffusion controlled portion 13. The buffer space 12 also plays a role as a space (preliminary chamber) for pumping oxygen into the measurement-object gas introduced through the first diffusion controlled portion 11. A preliminary pump cell 15 operates to pump oxygen into the buffer space 12. The second diffusion controlled portion 13 is a portion that applies predetermined diffusion resistance to the measurement-object gas introduced from the buffer space 12 into the first internal cavity 20. When the measurement-object gas is introduced from the outside of the sensor element 101 into the first internal cavity 20, the measurement-object gas rapidly taken into the sensor element 101 through the gas inlet port 10 due to pressure fluctuations of the measurement-object gas in the external space (when the measurement-object gas is the exhaust gas of an automobile, pulsation of exhaust pressure) is not directly introduced into the first internal cavity 20 but, after pressure fluctuations of the measurement-object gas are cancelled out through the first diffusion controlled portion 11, the buffer space 12, and the second diffusion controlled portion 13, the measurement-object gas is introduced into the first internal cavity 20. With this configuration, pressure fluctuations of the measurement-object gas introduced into the first internal cavity 20 are almost ignorable. The first internal cavity 20 is provided as a space used to adjust an oxygen partial pressure in the measurement-object gas introduced through the second diffusion controlled portion 13. A main pump cell 21 operates to adjust the oxygen partial pressure.

The preliminary pump cell 15 is an electrochemical pump cell including a preliminary pump electrode 16 provided almost all over the under surface of the second solid electrolyte layer 6, facing the buffer space 12, an outer pump electrode 23 disposed at an outer part of the sensor element 101, exposed to a measurement-object gas, and the second solid electrolyte layer 6 sandwiched by these electrodes. The preliminary pump electrode 16 is an electrode disposed at the most upstream side among the plurality of electrodes in the measurement-object gas flow portion. By passing a pump current $Ip0s$ between the preliminary pump electrode 16 and the outer pump electrode 23 with a pump voltage $Vp0s$ applied by a variable power supply 17 disposed between the preliminary pump electrode 16 and the outer pump electrode 23, the preliminary pump cell 15 is capable of pumping oxygen in the external space into the buffer space 12.

The main pump cell 21 is an electrochemical pump cell made up of an inner pump electrode 22 having a ceiling electrode portion 22a provided almost all over the under surface of the second solid electrolyte layer 6, facing the first internal cavity 20, the outer pump electrode 23 provided so as to be exposed to the external space in a region of the top surface of the second solid electrolyte layer 6, corresponding to the ceiling electrode portion 22a, and the second solid electrolyte layer 6 sandwiched by these electrodes.

The inner pump electrode 22 is formed over the upper and lower solid electrolyte layers (the second solid electrolyte layer 6 and the first solid electrolyte layer 4) defining the first internal cavity 20, and the spacer layer 5 providing a side wall. Specifically, the ceiling electrode portion 22a is formed on the under surface of the second solid electrolyte layer 6, providing a ceiling surface of the first internal cavity 20, a bottom electrode portion 22b is formed on the top surface of the first solid electrolyte layer 4, providing a bottom surface, a side electrode portion (not shown) is formed on the side wall surface (inner surface) of the spacer layer 5, making both side wall portions of the first internal cavity 20, so as to connect those ceiling electrode portion 22a and the bottom electrode portion 22b, and the inner pump electrode 22 is disposed with a structure in a tunnel form at a portion where the side electrode portion is disposed.

The inner pump electrode 22 and the outer pump electrode 23 each are formed as a porous cermet electrode (for example, a cermet electrode of Pt and $ZrO_2$, having an Au content of 1 percent). The inner pump electrode 22 that contacts with a measurement-object gas is formed by using a material of which the reduction ability for NOx components in the measurement-object gas is lowered.

By passing a pump current Ip0 in a positive direction or a negative direction between the inner pump electrode 22 and the outer pump electrode 23 by applying a desired pump voltage Vp0 between the inner pump electrode 22 and the outer pump electrode 23, the main pump cell 21 is capable of pumping out oxygen in the first internal cavity 20 to the external space or pumping oxygen in the external space into the first internal cavity 20.

In order to detect an oxygen concentration (oxygen partial pressure) in an atmosphere in the first internal cavity 20, an electrochemical sensor cell, that is, a main pump control oxygen partial pressure detection sensor cell 80, is made up of the inner pump electrode 22, the second solid electrolyte layer 6, the spacer layer 5, the first solid electrolyte layer 4, the third substrate layer 3, and the reference electrode 42.

An oxygen concentration (oxygen partial pressure) in the first internal cavity 20 is found by measuring an electromotive force (voltage V0) in the main pump control oxygen partial pressure detection sensor cell 80. In addition, the pump current Ip0 is controlled by executing feedback control over the pump voltage Vp0 of a variable power supply 24 such that the voltage V0 becomes a target value. With this configuration, it is possible to maintain the oxygen concentration in the first internal cavity 20 at a predetermined constant value.

The third diffusion controlled portion 30 is a portion that applies predetermined diffusion resistance to a measurement-object gas of which the oxygen concentration (oxygen partial pressure) is controlled by operation of the main pump cell 21 in the first internal cavity 20 to guide the measurement-object gas to the second internal cavity 40.

The second internal cavity 40 is provided as a space used to further adjust the oxygen partial pressure by using an auxiliary pump cell 50 for the measurement-object gas adjusted in the oxygen concentration (oxygen partial pressure) in the first internal cavity 20 in advance and then introduced through the third diffusion controlled portion 30. With this configuration, it is possible to highly accurately maintain the oxygen concentration in the second internal cavity 40 at a constant value, so it is possible to measure a highly accurate NOx concentration with the gas sensor 100.

The auxiliary pump cell 50 is an auxiliary electrochemical pump cell made up of an auxiliary pump electrode 51 having a ceiling electrode portion 51a provided substantially all over the under surface of the second solid electrolyte layer 6, facing the second internal cavity 40, the outer pump electrode 23 (not limited to the outer pump electrode 23, and an adequate electrode outside the sensor element 101 may be used), and the second solid electrolyte layer 6.

The auxiliary pump electrode 51 is disposed in the second internal cavity 40 with a structure in a similar tunnel form to that of the inner pump electrode 22 provided in the above-described first internal cavity 20. In other words, the auxiliary pump electrode 51 has such a structure in a tunnel form that a ceiling electrode portion 51a is formed on the second solid electrolyte layer 6 providing the ceiling surface of the second internal cavity 40, a bottom electrode portion 51b is formed on the first solid electrolyte layer 4 providing the bottom surface of the second internal cavity 40, a side electrode portion (not shown) that couples those ceiling electrode portion 51a and bottom electrode portion 51b is formed on each of both wall surfaces of the spacer layer 5, providing a side wall of the second internal cavity 40. The auxiliary pump electrode 51, as well as the inner pump electrode 22, is formed by using a material of which the reduction ability for NOx components in the measurement-object gas is lowered.

By applying a desired voltage Vp1 between the auxiliary pump electrode 51 and the outer pump electrode 23, the auxiliary pump cell 50 is capable of pumping out oxygen in an atmosphere in the second internal cavity 40 to the external space or pumping oxygen from the external space into the second internal cavity 40.

In order to control an oxygen partial pressure in an atmosphere in the second internal cavity 40, an electrochemical sensor cell, that is, an auxiliary pump control oxygen partial pressure detection sensor cell 81, is made up of the auxiliary pump electrode 51, the reference electrode 42, the second solid electrolyte layer 6, the spacer layer 5, the first solid electrolyte layer 4, and the third substrate layer 3.

The auxiliary pump cell 50 performs pumping with a variable power supply 52 of which the voltage is controlled in accordance with an electromotive force (voltage V1) detected by the auxiliary pump control oxygen partial pressure detection sensor cell 81. With this configuration, the oxygen partial pressure in an atmosphere in the second internal cavity 40 is controlled to a low partial pressure that substantially does not influence measurement of NOx.

Together with this, its pump current Ip1 is used to control the electromotive force of the main pump control oxygen partial pressure detection sensor cell 80. Specifically, the pump current Ip1 is input to the main pump control oxygen partial pressure detection sensor cell 80 as a control signal, and the gradient of the oxygen partial pressure in the measurement-object gas to be introduced from the third diffusion controlled portion 30 into the second internal cavity 40 is controlled to be constantly unchanged by controlling the above-described target value of the voltage V0. When used as a NOx sensor, the oxygen concentration in the second internal cavity 40 is maintained at a constant value of about 0.001 ppm by the functions of the main pump cell 21 and auxiliary pump cell 50.

The fourth diffusion controlled portion 60 is a portion that applies predetermined diffusion resistance to measurement-object gas of which the oxygen concentration (oxygen partial pressure) is controlled by operation of the auxiliary pump cell 50 in the second internal cavity 40 to guide the measurement-object gas to the third internal cavity 61. The fourth diffusion controlled portion 60 plays a role in limiting the amount of NOx flowing into the third internal cavity 61.

The third internal cavity 61 is provided as a space used to perform a process related to measurement of a nitrogen oxide (NOx) concentration in a measurement-object gas on the measurement-object gas adjusted in oxygen concentration (oxygen partial pressure) in the second internal cavity 40 in advance and then introduced through the fourth diffusion controlled portion 60. Measurement of a NOx concentration is mainly performed by operation of a measurement pump cell 41 in the third internal cavity 61.

The measurement pump cell 41 measures a NOx concentration in the measurement-object gas in the third internal cavity 61. The measurement pump cell 41 is an electrochemical pump cell made up of a measurement electrode 44 provided on the top surface of the first solid electrolyte layer 4, facing the third internal cavity 61, the outer pump electrode 23, the second solid electrolyte layer 6, the spacer layer 5, and the first solid electrolyte layer 4. The measurement electrode 44 is a porous cermet electrode made of a material of which the reduction ability for NOx components in the measurement-object gas is raised as compared to the inner pump electrode 22. The measurement electrode 44 also functions as a NOx reduction catalyst that reduces NOx present in an atmosphere in the third internal cavity 61.

The measurement pump cell 41 is capable of pumping out oxygen produced as a result of decomposition of nitrogen oxides in an atmosphere around the measurement electrode 44 and detecting the amount of oxygen produced as a pump current Ip2.

In order to detect an oxygen partial pressure around the measurement electrode 44, an electrochemical sensor cell, that is, a measurement pump control oxygen partial pressure detection sensor cell 82, is made up of the first solid electrolyte layer 4, the third substrate layer 3, the measurement electrode 44, and the reference electrode 42. A variable power supply 46 is controlled in accordance with an electromotive force (voltage V2) detected by the measurement pump control oxygen partial pressure detection sensor cell 82.

A measurement-object gas guided into the second internal cavity 40 reaches the measurement electrode 44 in the third internal cavity 61 through the fourth diffusion controlled portion 60 in a situation in which the oxygen partial pressure is controlled. Nitrogen oxides in the measurement-object gas around the measurement electrode 44 are reduced ($2NO \rightarrow N_2 + O_2$) to produce oxygen. The produced oxygen is to be pumped by the measurement pump cell 41. At this time, the voltage Vp2 of the variable power supply 46 is controlled such that the voltage V2 detected by the measurement pump control oxygen partial pressure detection sensor cell 82 is constant (target value). The amount of oxygen produced around the measurement electrode 44 is proportional to the concentration of nitrogen oxides in the measurement-object gas, so a nitrogen oxide concentration in the measurement-object gas is calculated by using the pump current Ip2 in the measurement pump cell 41.

An electrochemical sensor cell 83 is made up of the second solid electrolyte layer 6, the spacer layer 5, the first solid electrolyte layer 4, the third substrate layer 3, the outer pump electrode 23, and the reference electrode 42, and it is possible to detect an oxygen partial pressure in a measurement-object gas outside the sensor by using an electromotive force (voltage Vref) obtained by the sensor cell 83.

In the gas sensor 100 having such a configuration, a measurement-object gas of which the oxygen partial pressure is maintained at a constantly unchanged low value (a value that substantially does not influence measurement of NOx) is supplied to the measurement pump cell 41 by operating the main pump cell 21 and the auxiliary pump cell 50. Therefore, it is possible to find a NOx concentration in the measurement-object gas in accordance with a pump current Ip2 that flows as a result of pumping out oxygen, produced by reduction of NOx, by the measurement pump cell 41 substantially in proportion to a NOx concentration in the measurement-object gas.

In addition, the sensor element 101 includes the heater portion 70 that plays a role in temperature adjustment for maintaining the temperature of the sensor element 101 by heating in order to increase the oxygen ion conductivity of the solid electrolytes. The heater portion 70 includes a heater 72, a heater insulating layer 74, and a pressure release hole 75.

The heater 72 is an electric resistor formed in such a manner as to be sandwiched by the second substrate layer 2 and the third substrate layer 3 from upper and lower sides. The heater 72 is supplied with electric power from a heater power supply 76 (see FIG. 2 and FIG. 3) to generate heat to increase and retain the temperature of the solid electrolytes forming the sensor element 101.

The heater 72 is embedded all over the region from the first internal cavity 20 to the third internal cavity 61, and is capable of adjusting the overall sensor element 101 to a temperature at which the solid electrolytes are activated.

The heater insulating layer 74 is an electrically insulating layer formed from an electrically insulating material, such as alumina, on the top and under surfaces of the heater 72. The heater insulating layer 74 formed for the purpose of obtaining an electrical insulation property between the second substrate layer 2 and the heater 72 and an electrical insulation property between the third substrate layer 3 and the heater 72.

The pressure release hole 75 is a portion provided so as to extend through the third substrate layer 3 and the atmosphere inlet layer 48 and communicate with the reference gas inlet space 43. The pressure release hole 75 is formed for the purpose of easing an increase in internal pressure resulting from an increase in temperature in the heater insulating layer 74.

Connector electrodes 71 are disposed at a rear end side of the sensor element 101. The connector electrodes 71 include connector electrodes 71a to 71d disposed at the rear end of the top surface of the sensor element 101, and connector electrodes 71e to 71h disposed at the rear end of the under surface of the sensor element 101. The connector electrodes 71 function as terminals used to provide electrical continuity between the sensor element 101 and a device outside the sensor element 101. The connector electrodes 71a to 71e are respectively electrically continuous in a one-to-one correspondence with the preliminary pump electrode 16, the inner pump electrode 22, the auxiliary pump electrode 51, the measurement electrode 44, and the reference electrode 42 via leads disposed inside the sensor element 101 (see FIG. 2). One end of the heater 72 is connected to a connector electrode 71f via an energizing lead 77f disposed inside the sensor element 101. The other end of the heater 72 is connected to the connector electrode 71g via an energizing lead 77g disposed inside the sensor element 101. Although not shown in FIG. 2 for the sake of schematic illustration of the energizing lead 77g, the energizing lead 77g also includes a conductor in a through-hole 73 in FIG. 1. A voltage measurement lead 77h is also connected to one end of the heater 72 in parallel with the energizing lead 77f, and one end of the heater 72 and the connector electrode 71h are connected via the voltage measurement lead 77h. As shown in FIG. 2, the connector electrode 71f is connected to not only the heater 72 but also the outer pump electrode 23 via leads disposed inside the sensor element 101. For this reason, in the present embodiment, a lead extending from the outer pump electrode 23 and the energizing lead 77f merge on the way into an internal common lead 78, and the internal common lead 78 is connected to the connector electrode 71f. In other words, the internal common lead 78 serves as both at least part of an electric circuit between the outer pump electrode 23 and the connector electrode 71f and at least part of an electric circuit (here, the energizing lead 77f) that connects the heater 72 and the connector electrode 71f. The connector electrode 71f is a common terminal serving as both a terminal for connecting the outer pump electrode 23 and a device outside the sensor element 101 and a terminal for connecting one end of the heater 72 and a device outside the sensor element 101.

As shown in FIG. 3, the control apparatus 90 includes the above-described variable power supplies 17, 24, 46, 52, the heater power supply 76, an inter-electrode voltage acquisition section 85, a heater current acquisition section 86, a first heater voltage acquisition section 87, a second heater voltage acquisition section 88, and a controller 91.

As shown in FIG. 2, the inter-electrode voltage acquisition section 85 is connected to each of the connector electrode 71e and the connector electrode 71f by a lead. With this configuration, the inter-electrode voltage acquisition section 85 acquires the voltage between the outer pump electrode 23 and the reference electrode 42, that is, the voltage Vref of the above-described sensor cell 83.

As shown in FIG. 2, the heater power supply 76 is connected to each of the connector electrode 71f and the connector electrode 71g by a lead, and supplies an electric power to the heater 72 by applying a voltage between the connector electrodes 71f, 71g. The heater current acquisition section 86 is connected between the connector electrode 71f and the heater power supply 76, and acquires a heater current Ih that flows as a result of supplying an electric power to the heater 72.

As described above, the connector electrode 71f is connected to each of the inter-electrode voltage acquisition section 85 and the heater power supply 76. Therefore, in the present embodiment, the lead connected to the connector electrode 71f is an external common lead 79, and leads diverging from an end portion opposite from the connector electrode 71f in the external common lead 79 connect the external common lead 79 to the inter-electrode voltage acquisition section 85 and the heater power supply 76. In other words, the external common lead 79 serves as both at least part of an electric circuit between the inter-electrode voltage acquisition section 85 and the connector electrode 71f and at least part of an electric circuit between the heater power supply 76 and the connector electrode 71f.

The first heater voltage acquisition section 87 is connected to each of the connector electrode 71g and the connector electrode 71h by a lead. With this configuration, the first heater voltage acquisition section 87 acquires a first heater voltage Vhf that is the voltage between one end and the other end of the heater 72. The second heater voltage acquisition section 88 is connected to each of the connector electrode 71f and the connector electrode 71h by a lead. With this configuration, the second heater voltage acquisition section 88 acquires a second heater voltage Vh2 that is a voltage corresponding to a voltage drop in the energizing lead 77f of the heater 72.

The connector electrode 71f is connected to a ground (GND), and the potential of the ground is a reference for the potentials of the electrodes 16, 22, 23, 42, 44, 51, and the like. In the present embodiment, the controller 91 is configured to derive the value of the potential of each electrode on the assumption that the potential of the ground is 2.5 V.

Although wires are not shown in FIG. 2, the variable power supplies 17, 24, 52, 46, and the like shown in FIG. 1 and FIG. 3 are also actually connected to the electrodes inside the sensor element 101 via the connector electrodes 71. The above-described pump currents Ips, Ip0, Ip1, Ip2, voltages V0, V1, V2 are also actually acquired by acquisition sections (not shown) connected to the electrodes inside the sensor element 101 via the connector electrodes 71, as in the case of the inter-electrode voltage acquisition section 85 and the heater current acquisition section 86.

The controller 91 is a microprocessor including a CPU 92, a storage section 94, and the like. The storage section 94 is, for example, a device that stores various programs and various data. The controller 91 receives the pump currents Ip0s, Ip0, Ip1, Ip2 and voltages V0, V1, V2 acquired by the above-described acquisition sections (not shown). The controller 91 receives the voltage Vref acquired by the inter-electrode voltage acquisition section 85, the heater current Ih acquired by the heater current acquisition section 86, the first heater voltage Vh1 acquired by the first heater voltage acquisition section 87, and the second heater voltage Vh2 acquired by the second heater voltage acquisition section 88. The controller 91 also receives information on a temperature detected by a temperature sensor 89 disposed in a vehicle separately from the gas sensor 100. In the present embodiment, the temperature sensor 89 is an outside air temperature sensor. The controller 91 controls the voltages Vp0s, Vp0, Vp1, Vp2 output from the variable power supplies 17, 24, 46, 52 by outputting control signals to the variable power supplies 17, 24, 46, 52, thus controlling the preliminary pump cell 15, the main pump cell 21, the measurement pump cell 41, and the auxiliary pump cell 50. The controller 91 controls the electric power supplied from the heater power supply 76 to the heater 72 by outputting a control signal to the heater power supply 76. The storage section 94 also stores target values V0*, V1*, V2*, and the like (described later). The CPU 92 of the controller 91 controls the cells 21, 41, 50 by referencing these target values V0*, V1*, V2*.

The controller 91 executes feedback control over the voltage Vp0s of the variable power supply 17 such that the pump current Ip0s of the preliminary pump cell 15 becomes the target value Ip0s*. The controller 91 controls the voltage Vp0s such that oxygen is pumped into the buffer space 12, and does not control the voltage Vp0s such that oxygen is pumped out from the buffer space 12. In the present embodiment, the target value Ip0s* is set as a constant value in the controller 91. Therefore, the controller 91 controls the preliminary pump cell 15 such that oxygen is pumped into the buffer space 12 at a constant flow rate. The target value Ip0$s$* is set as a value by which, even when a measurement-object gas outside the sensor element 101 is a low oxygen atmosphere (for example, an atmosphere of which the oxygen concentration is lower than or equal to 0.1 percent by volume, lower than 0.2 percent by volume, lower than 1 percent by volume, or the like), a measurement-object gas into which oxygen is pumped by the preliminary pump cell 15 (that is, a measurement-object gas to be introduced into the first internal cavity 20) does not become a low oxygen atmosphere. When the air-fuel ratio of a measurement-object gas is lower than a stoichiometric air-fuel ratio, that is, the measurement-object gas is a rich atmosphere, the measurement-object gas contains hydrocarbons (HC), carbon monoxide, and the like as unburned components, so it is possible to obtain an oxygen concentration from the amount of oxygen needed to burn the unburned components in just proportion. Therefore, the oxygen concentration in a rich atmosphere is expressed with a minus sign. Hence, for example, the target value Ip0$s$* is determined in advance as follows. First, lowest values of the oxygen concentration of exhaust gas in various operation statuses of the internal combustion engine that uses the gas sensor 100 (including a case where the oxygen concentration decreases to a negative value) are checked in advance. Then, a target value Ip0$s$* is determined in accordance with the amount of oxygen needed to increase the oxygen concentration of a measurement-object gas having a lowest oxygen concentration into a state higher in oxygen concentration than a low oxygen atmosphere (for example, the oxygen concentration is higher than 0.1 percent by volume, higher than or equal to 0.2 percent by volume, higher than or equal to 1 percent by volume, or the like). The value of the target value Ip0$s$* may be determined as needed in accordance with experiments as described above and may be set to, for example, greater than or equal to 0.5 mA and less than or equal to 3 mA. The controller 91 may control the preliminary pump cell 15 such that the pump current Ip0$s$ becomes a constant value (target value Ip0$s$*) by controlling the voltage Vp0$s$ of the variable power supply 17 at a constant value, instead of executing feedback control over the voltage Vp0$s$ of the variable power supply 17 such that the pump current Ip0$s$ becomes a constant target value Ip0$s$* in the preliminary pump control process. Here, it is presumable that, when a measurement-object gas in a low oxygen atmosphere is introduced into the first internal cavity 20, the inner pump electrode 22 functions as a catalyst and, as a result, reduction of NOx occurs in the first internal cavity 20 before the measurement-object gas reaches the third internal cavity 61. It is also presumable that, when a measurement-object gas is a rich atmosphere and contains unburned components, NOx reacts with the unburned components to be reduced before the measurement-object gas reaches the third internal cavity 61. In contrast, when the preliminary pump cell 15 pumps oxygen into the buffer space 12, it is possible to suppress introduction of a measurement-object gas in a low oxygen atmosphere into the first internal cavity 20 and cause unburned components in the measurement-object gas to react with oxygen. Therefore, it is possible to suppress reduction of NOx before a measurement-object gas reaches the third internal cavity 61, so the detection accuracy of the NOx concentration improves. For example, in the case of a gasoline engine, the air-fuel ratio of a measurement-object gas mostly changes around the stoichiometric air-fuel ratio, so the measurement-object gas may be constantly a low oxygen atmosphere or may be frequently a rich atmosphere.

Even in such a case as well, when the preliminary pump cell 15 pumps in oxygen, it is possible to accurately detect a NOx concentration.

The controller 91 executes feedback control over the pump voltage Vp0 of the variable power supply 24 such that the voltage V0 becomes a target value (referred to as target value V0*) (that is, the oxygen concentration of the first internal cavity 20 becomes a constant target concentration). Therefore, the pump current Ip0 varies according to an oxygen concentration in a measurement-object gas and the flow rate of oxygen pumped in by the preliminary pump cell 15.

The controller 91 executes feedback control over the voltage Vp1 of the variable power supply 52 such that the voltage V1 becomes a constant value (referred to as target value V1*) (that is, the oxygen concentration of the second internal cavity 40 becomes a predetermined low oxygen concentration that does not substantially influence measurement of NOx). Together with this, the controller 91 sets (executes feedback control over) the target value V0* of the voltage V0 in accordance with the pump current Ip1 such that the pump current Ip1 that flows due to the voltage Vp1 becomes a constant value (referred to as target value Ip1*). With this configuration, the gradient of oxygen partial pressure in a measurement-object gas to be introduced from the third diffusion controlled portion 30 into the second internal cavity 40 is constantly unchanged. In addition, the oxygen partial pressure in an atmosphere in the second internal cavity 40 is controlled to a low partial pressure that substantially does not influence measurement of NOx.

Furthermore, the controller 91 executes feedback control over the voltage Vp2 of the variable power supply 46 such that the voltage V2 becomes a constant value (referred to as target value V2*) (that is, the oxygen concentration in the third internal cavity 61 becomes a predetermined low concentration). With this configuration, oxygen is pumped out from the third internal cavity 61 such that oxygen produced as a result of reduction of NOx in a measurement-object gas in the third internal cavity 61 becomes substantially zero. Then, the controller 91 acquires a pump current Ip2 as a detected value corresponding to oxygen that is produced in the third internal cavity 61 from a specific gas (here, NOx) and calculates a NOx concentration in the measurement-object gas in accordance with the pump current Ip2.

The storage section 94 stores, for example, an expression of linear function as a relational expression between a pump current Ip2 and a NOx concentration. This relational expression may be obtained in advance by experiments.

The controller 91 executes a heater control process of controlling the heater power supply 76 such that the temperature of the heater 72 becomes a target temperature. The temperature of the heater 72 is expressed by a linear function of a resistance value of the heater, so, in the heater control process, the controller 91 controls the heater power supply 76 such that the resistance value of the heater becomes a target resistance value. When the heater control process is started, the CPU 92 of the controller 91 initially starts energization of the heater 72 by controlling the heater power supply 76 to cause the heater 72 to generate heat. The CPU 92 derives the resistance value of the heater 72 by using a three-terminal method. Specifically, the CPU 92 derives a difference between a first heater voltage Vh1 acquired from the first heater voltage acquisition section 87 and a second heater voltage Vh2 acquired from the second heater voltage acquisition section 88 and sets the derived value as a heater voltage Vh that is the voltage between both ends of the heater 72. Then, by dividing the heater voltage Vh by the heater current Ih acquired from the heater current acquisition section 86, the resistance value of the heater 72 is derived. Here, as described above, the first heater voltage Vh1 is the voltage between the connector electrode 71h and the connector electrode 71g, and the first heater voltage Vh1 contains not only the voltage between both ends of the heater 72 but also a voltage drop in an energizing lead inside the sensor element 101, connected to the other end of the heater 72 (here, the energizing lead 77g), and an energizing lead outside the sensor element 101. The CPU 92 derives a heater voltage Vh that is the voltage between both ends of the heater 72 by using a relational expression Vh=Vh1−Vh2 on the assumption that the above voltage drop is equal to a second heater voltage Vh2 corresponding to a voltage drop in the energizing lead inside the sensor element 101, connected to one end of the heater 72 (here, the energizing lead 77f), and the energizing lead outside the sensor element 101. Thus, it is possible to accurately derive the resistance value of the heater 72. The controller 91 executes feedback control over the electric power supplied from the heater power supply 76 by outputting a control signal to the heater power supply 76 such that the derived resistance value of the heater 72 becomes a target resistance value. The heater power supply 76 adjusts the electric power supplied to the heater 72 by, for example, changing the value of the voltage applied to the heater 72.

An example of a NOx concentration detection process of detecting a NOx concentration in a measurement-object gas, which is executed by the controller 91 of the thus configured gas sensor 100, will be described below. The CPU 92 of the controller 91, before starting the NOx concentration detection process, initially starts the above-described heater control process to control the heater 72 such that the temperature becomes a target temperature (for example, 800° C., or the like). Because the temperature of the heater 72 is also influenced by the temperature of a measurement-object gas, the CPU 92 continues the heater control process even after the start of the NOx concentration detection process. Therefore, the heater current Ih varies moment by moment. When the temperature of the heater 72 reaches near the target temperature, the CPU 92 starts the NOx concentration detection process. In the NOx concentration detection process, initially, the CPU 92 starts to control the above-described pump cells 15, 21, 41, 50 and acquire voltages V0, V1, V2, Vref from the above-described sensor cells 80 to 83. In this state, when a measurement-object gas is introduced through the gas inlet port 10, the measurement-object gas is initially introduced into the buffer space 12 after passing through the first diffusion controlled portion 11, and oxygen is pumped in by the preliminary pump cell 15 in the buffer space 12. Subsequently, the measurement-object gas into which oxygen is pumped reaches the first internal cavity 20. After that, the oxygen concentration of the measurement-object gas in each of the first internal cavity 20 and the second internal cavity 40 is adjusted by a corresponding one of the main pump cell 21 and the auxiliary pump cell 50, and the adjusted measurement-object gas reaches the third internal cavity 61. The CPU 92 detects a NOx concentration in the measurement-object gas in accordance with the acquired pump current Ip2 and the relational expression stored in the storage section 94. The CPU 92 sends the detected NOx concentration to an engine ECU and ends the NOx concentration detection process. The CPU 92 may execute the NOx concentration detection process at, for example, predetermined time intervals or at timing at which an instruction to detect a NOx concentration is provided from the engine ECU.

Figure 4:
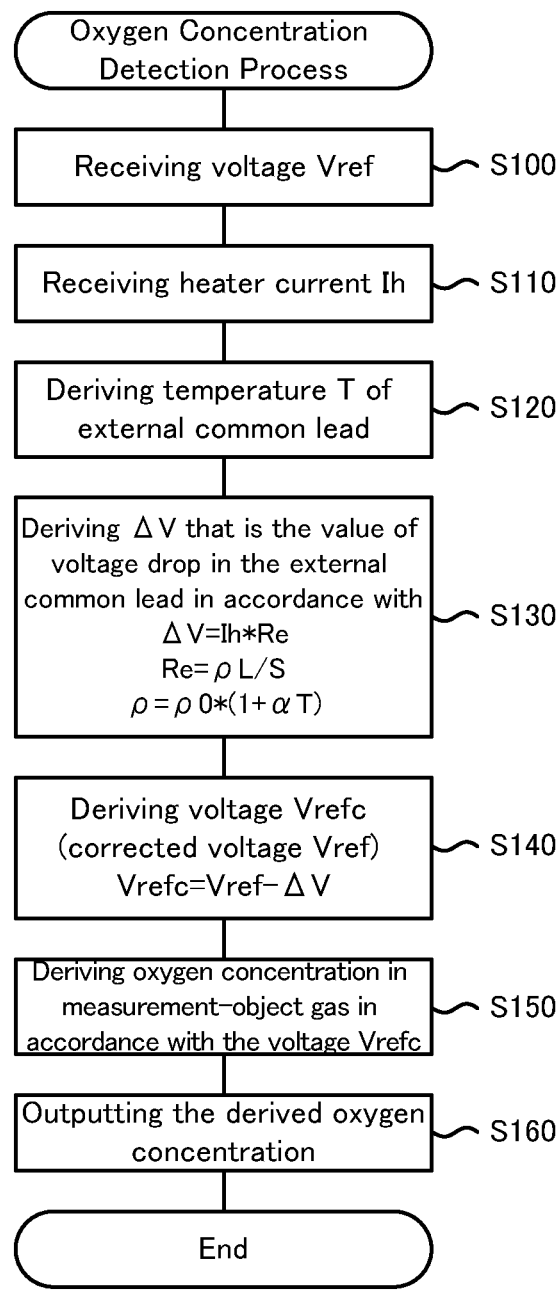
FIG. 4 is a flowchart showing an example of an oxygen concentration detection process.

The controller 91 also executes an oxygen concentration detection process of detecting an oxygen concentration in the measurement-object gas at predetermined detection timing after the temperature of the heater 72 has reached near the target temperature. The predetermined detection timing may be, for example, timing at predetermined time intervals or may be timing at which an instruction to detect an oxygen concentration is provided from the engine ECU. The controller 91 is also capable of executing the oxygen concentration detection process in parallel with the NOx concentration detection process. FIG. 4 is a flowchart showing an example of the oxygen concentration detection process.

When the oxygen concentration detection process is started, the CPU 92 initially receives a voltage Vref from the inter-electrode voltage acquisition section 85 (step S100) and subsequently receives a heater current Ih from the heater current acquisition section 86 (step S110). Subsequently, the CPU 92 derives the temperature T[° C.] of the external common lead 79 (step S120). In the present embodiment, the CPU 92 directly acquires the temperature received from the temperature sensor 89 as the temperature T of the external common lead 79. In other words, the CPU 92 assumes that the temperature T of the external common lead 79 is equal to an outside air temperature. The correspondence relation between an outside air temperature and a temperature of the external common lead 79 may be stored in advance in the storage section 94, and the CPU 92 may derive the temperature T in accordance with a temperature received from the temperature sensor 89, and the correspondence relation.

Subsequently, the CPU 92 derives ΔV [V] that is the value of a voltage drop in the external common lead 79 in accordance with the heater current Ih acquired in step S110 and the temperature T acquired in step S120 (step S130). In step S130, the voltage drop ΔV is derived by using the following expressions (1) to (3). In other words, the CPU 92 derives an electric resistivity ρ of the external common lead 79 at the temperature T from the expression (3) in accordance with an electric resistivity ρ0 of the external common lead 79 at 0° C. and the temperature T of the external common lead 79. The CPU 92 derives a resistance value Re of the external common lead 79 from the expression (2) in accordance with the electric resistivity ρ, and the length L and cross-sectional area S of the external common lead 79. The CPU 92 derives a voltage drop ΔV from the expression (1) based on Ohm's law in accordance with a current flowing through the resistance Re and the external common lead 79, that is, a heater current Ih.

$$\Delta V = Ih * Re \tag{1}$$

$$Re = \rho L/S \tag{2}$$

$$\rho = \rho 0 * (1 + \alpha * T) \tag{3}$$

(where

Re: the resistance value [Ω] of the external common lead 79,

ρ: the electric resistivity [Ω·m] of the external common lead 79,

ρ0: the electric resistivity [Ω·m] of the external common lead 79 at 0° C.,

α: the temperature coefficient [/° C.] of the external common lead 79,

L: the length [m] of the external common lead 79, and

S: the cross-sectional area [m$^2$] of the external common lead 79)

The relational expressions as expressed by the expressions (1) to (3) are stored in the storage section 94 in advance. Of the above values, ρ0, α, L, and S are constants, values according to the material (for example, copper or the like), length, and thickness of the external common lead 79 are stored in the storage section 94 in advance at the time of manufacturing the gas sensor 100, at the time of installing the gas sensor 100 in a vehicle, or other times. Therefore, the CPU 92 is able to derive a voltage drop ΔV in the external common lead 79 in accordance with a heater current Ih and a temperature T and information stored in the storage section 94 in advance. The above (1) to (3) and the constants do not need to be stored in the storage section 94 as-is, and information needed to derive a voltage drop ΔV in accordance with a heater current Ih and a temperature T just needs to be stored in the storage section 94. For example, the storage section 94 may store a single relational expression obtained by substituting the expression (2) and the expression (3) into the expression (1). A length L and a cross-sectional area S each do not need to be stored in the storage section 94, and a value of L/S may be stored in the storage section 94.

When the voltage drop ΔV in the external common lead 79 is derived in step S130, the CPU 92 derives a voltage Vrefc that is a corrected voltage Vref by correcting the voltage Vref acquired in step S100 in accordance with the voltage drop ΔV (step S140). As is apparent from FIG. 2, the external common lead 79 serves as both at least part of an electric circuit used by the inter-electrode voltage acquisition section 85 to acquire the voltage Vref and at least part of an electric circuit used to supply an electric power from the heater power supply 76 to the heater 72. For this reason, the voltage Vref acquired by the inter-electrode voltage acquisition section 85 contains the value of a voltage drop due to the heater current Ih flowing through the external common lead 79. Therefore, the CPU 92 derives the voltage Vrefc by subtracting the voltage drop ΔV from the voltage Vref. The voltage Vrefc derived in this way is a value close to the voltage between the reference electrode 42 and the outer pump electrode 23, which is a voltage Vref originally desired to be measured, as compared to the voltage Vref before correction. Therefore, by deriving the voltage Vrefc, the measurement accuracy of the voltage between the reference electrode 42 and the outer pump electrode 23 improves. Because the pump currents Ip0s, Ip0, Ip1, Ip2 also flow through the outer pump electrode 23, these pump currents also flow via the connector electrode 71f although not shown in the drawing, and may also flow through the external common lead 79 depending on the status of connection of wires outside the sensor element 101. However, generally, these pump currents have significantly small values (for example, less than or equal to a hundredth) as compared to the heater current Ih, so voltage drops due to these pump currents presumably almost do not influence the measurement accuracy of the voltage between the reference electrode 42 and the outer pump electrode 23. Not only the external common lead 79 but also the internal common lead 78 is also present in the electric circuit used to acquire the voltage Vref, and a voltage drop due to the heater current Ih also occurs in the internal common lead 78. However, because the internal common lead 78 has a significantly shorter length than the external common lead 79, a voltage drop in the internal common lead 78 presumably almost does not influence the measurement accuracy of the voltage between the reference electrode 42 and the outer pump electrode 23.

When the voltage Vrefc is derived in step S140, the CPU 92 derives an oxygen concentration in the measurement-object gas in accordance with the voltage Vrefc (step S150). Since the outer pump electrode 23 is disposed so as to contact with the measurement-object gas and the reference electrode 42 is disposed so as to contact with the reference gas, the voltage between the outer pump electrode 23 and the reference electrode 42 becomes a value based on a difference in oxygen concentration between the measurement-object gas and the reference gas. Therefore, it is possible to detect the oxygen concentration in the measurement-object gas in accordance with the voltage. For example, the correspondence relation between an oxygen concentration in a measurement-object gas and a voltage between the outer pump electrode 23 and the reference electrode 42 is stored in the storage section 94 as a relational expression or a map, and the CPU 92 derives an oxygen concentration in a measurement-object gas in accordance with the correspondence relation and the voltage Vrefc. Because the voltage Vrefc is a value closer to the voltage between the outer pump electrode 23 and the reference electrode 42 than the voltage Vref as described above, the measurement accuracy of an oxygen concentration in a measurement-object gas improves by using the voltage Vrefc. Then, the CPU 92 outputs the derived oxygen concentration to, for example, the engine ECU or the like (step S160), and ends the oxygen concentration detection process.

In this way, in the oxygen concentration detection process, the inter-electrode voltage acquisition section 85 derives a voltage Vrefc that is a corrected voltage Vref by correcting a measured voltage Vref in accordance with the value of a voltage drop in the external common lead 79. Then, an oxygen concentration in the measurement-object gas is detected in accordance with the voltage Vrefc.

The oxygen concentration detected by the controller 91 in step S150 may be a negative value. When, for example, the air-fuel ratio (A/F) of a measurement-object gas is less than the stoichiometric air-fuel ratio, that is, the measurement-object gas is a rich atmosphere, the oxygen concentration is a negative value. Since a measurement-object gas in a rich atmosphere contains unburned components, an oxygen concentration that is obtained from the amount of oxygen needed to burn the fuel in proportion is the absolute value of a negative oxygen concentration in a measurement-object gas in a rich atmosphere. When the measurement-object gas is an exhaust gas from the internal combustion engine, the controller 91 may derive an air-fuel ratio (A/F) as an oxygen concentration in the measurement-object gas in step S150. Since the air-fuel ratio of exhaust gas and the oxygen concentration are able to be converted to each other as described above, derivation of an air-fuel ratio may also be regarded as a type of derivation of an oxygen concentration. A conversion expression between an oxygen concentration and an A/F is known (see, for example, Brettschneider, Johannes, "Berechnung des Liftverhaeltnisses λ von Luft-Kraftstoff-Gemsichen und des Einflusses on MeBfehlern auf λ", Bosch Technische Berichte, Band6, Heft 4, Seite 177-186, Stuttgart, 1979, or the like).

The inventors studied the relation between an oxygen concentration in a measurement-object gas and a voltage Vref in a state where a heater current Ih flowed through the external common lead 79. In this study, an element in which the preliminary pump electrode 16 is not included, the outer pump electrode 23 is connected to the connector electrode 71a, one end of the heater 72 is connected to the connector electrode 71f via the energizing lead 77f, and the internal common lead 78 is not included, was used as the sensor element 101. The connector electrode 71a and the connector electrode 71f of the sensor element 101 were short-circuited outside, and the inter-electrode voltage acquisition section 85, the heater current acquisition section 86, and the heater power supply 76 were connected to the sensor element 101 as shown in FIG. 2. A cable of a copper wire of AWG22 in the regulation of AWG (American Wire Gauge) was used as the external common lead 79. The gas sensor 100 in this state was installed in a pipe such that a measurement-object gas flowing through the pipe was caused to contact with the outer pump electrode 23. The atmosphere as a reference gas was caused to contact with the reference electrode 42 via the reference gas inlet space 43 and the atmosphere inlet layer 48. A model gas was adjusted and used as the measurement-object gas. For a model gas, nitrogen was used as a base gas, the temperature was set to 260° C., the flow rate was set to 50 L/min, the moisture additive amount was set to 3 percent by volume, and the NO concentration was set to 500 ppm by volume, and the A/F of the model gas was adjusted to about 12 to 30 by adjusting the amount of oxygen in the model gas and the amount of ethylene gas as a fuel gas. The exhaust gas from a gasoline engine is assumed as the model gas, and, when the A/F is the stoichiometric air-fuel ratio when the A/F is 14.7, that is, the oxygen concentration is 0 percent by volume. When the A/F is less than 14.7, the atmosphere is a rich atmosphere (the atmosphere does not contain oxygen but contains unburned components), and the oxygen concentration becomes a negative value. When the A/F is greater than 14.7, the atmosphere is a lean atmosphere (the atmosphere contains oxygen but does not contain unburned components), and the oxygen concentration becomes a positive value. The diameter of a pipe used to flow the model gas was set to 20 mm. The A/F of the model gas was measured by using MEXA-730λ made by HORIBA, Ltd. The length L of the external common lead 79 was set to 4 m, the external common lead 79 was in a state of room temperature (20° C.), an electric power was supplied from the heater power supply 76 to the heater 72 such that the heater current Ih became 0.68 A, and then the model gas was caused to flow through the pipe. In this state, the relation between an A/F and a voltage Vref acquired by the inter-electrode voltage acquisition section 85 was investigated by changing the oxygen concentration (here, A/F) of the model gas. The relation between an A/F and a voltage Vref was similarly investigated for each case where the length L of the external common lead 79 was set to 7 m, 10 m, or 13.5 m.

Figure 5:
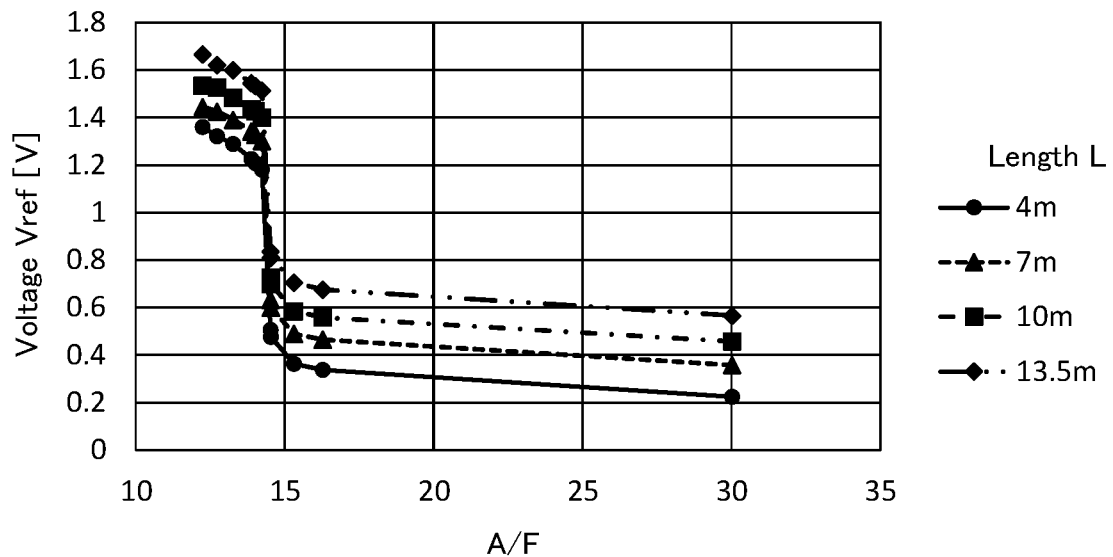
FIG. 5 is a graph showing the relation between an A/F of a measurement-object gas and a voltage Vref.

FIG. 5 is a graph showing the relation between an A/F of a measurement-object gas and a voltage Vref. As shown in FIG. 5, even when the A/F was the same, the value of the voltage Vref increased as the length L of the external common lead 79 increased. It is found from this result that there is a deviation in the correspondence relation between a voltage Vref and an A/F due to the external common lead 79 and it is not possible to accurately derive the A/F, that is, the oxygen concentration in a measurement-object gas, from the voltage Vref. When a similar study was made in a state where the connector electrode 71a and the connector electrode 71f were not short-circuited and no external common lead 79 was provided and the sensor element 101 and the inter-electrode voltage acquisition section 85 were connected such that the inter-electrode voltage acquisition section 85 acquired the voltage between the connector electrodes 71a, 71f as the voltage Vref, the value of the voltage Vref was substantially the same value when the A/F was the same even when the length of the lead for the electric circuit between the inter-electrode voltage acquisition section 85 and the sensor element 101 was changed.

Figure 6:
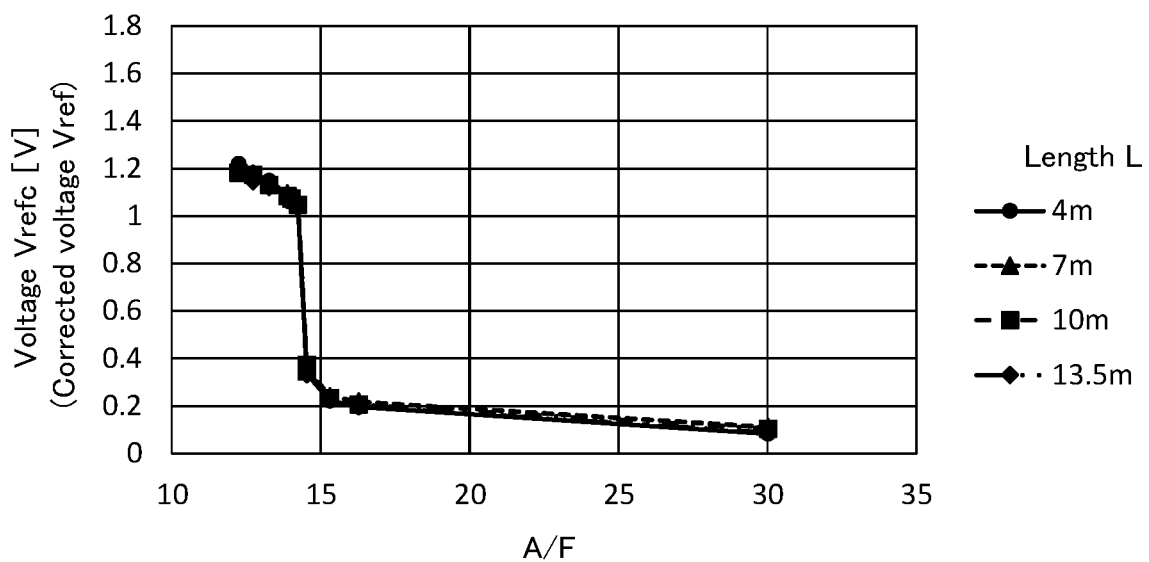
FIG. 6 is a graph showing the relation between an A/F of a measurement-object gas and a voltage Vrefc that is a corrected voltage Vref.

For each of the voltages Vref shown in FIG. 5, a voltage drop ΔV was calculated as in the case of the above-described step S130, and the voltage Vrefc that is the corrected voltage Vref was derived by using the same method as that of step S140. In deriving a voltage drop ΔV, the temperature T of the external common lead 79 was set to room temperature, that is, 20° C. Because a resistance value per unit length at 20° C. in the lead used for the external common lead 79 was 52 Ω/km, the resistance value Re of the external common lead 79 was derived in accordance with this value and the length L, and a voltage drop ΔV was derived in accordance with the resistance value Re and the heater current Ih (=0.68 A). FIG. 6 is a graph showing the relation between an A/F of a measurement-object gas and a voltage Vrefc. As shown in FIG. 6, the correspondence relation between a voltage Vrefc and an A/F was substantially the same relation regardless of the length of the external common lead 79. Therefore, it is found that, by making a correction in accordance with a voltage drop ΔV, the A/F, that is, the oxygen concentration in a measurement-object gas is accurately derived from the corrected voltage Vrefc.

Here, the correspondence relation between the components of the present embodiment and the components of the present invention are made apparent. The layered body in which the six layers, that is, the first substrate layer 1, the second substrate layer 2, the third substrate layer 3, the first solid electrolyte layer 4, the spacer layer 5, and the second solid electrolyte layer 6 of the present embodiment, are laminated in this order corresponds to an element body of the present invention, the outer pump electrode 23 corresponds to a first electrode and an outer electrode, the reference electrode 42 corresponds to a second electrode and a reference electrode, the heater 72 corresponds to a heater, the inter-electrode voltage acquisition section 85 corresponds to a voltage acquisition section, the heater power supply 76 corresponds to a heater power supply, the external common lead 79 corresponds to an external common lead, the controller 91 corresponds to a correction section, an oxygen concentration detection section, and a specific gas concentration detection section. The internal common lead 78 corresponds to an internal common lead, the connector electrode 71f corresponds to a common terminal, the third internal cavity 61 corresponds to a measurement chamber, the reference gas inlet space 43 and the atmosphere inlet layer 48 correspond to a reference gas inlet portion, the controller 91 and the variable power supplies 17, 24, 52 correspond to an oxygen concentration adjustment section, the measurement pump control oxygen partial pressure detection sensor cell 82 corresponds to a measurement voltage detection section, and the pump current Ip2 corresponds a detected value.

With the above-described gas sensor 100 of the present embodiment, the controller 91 derives the value of a voltage drop ΔV in the external common lead 79 in accordance with the heater current Ih and corrects the voltage Vref acquired by the inter-electrode voltage acquisition section 85 in accordance with the voltage drop ΔV, so the measurement accuracy of the voltage between the outer pump electrode 23 and the reference electrode 42 improves.

The controller 91 derives a voltage drop ΔV in the external common lead 79 in accordance with the heater current Ih and the length L of the external common lead 79. By considering not only the heater current Ih but also the length L of the external common lead 79 in this way, a voltage drop ΔV is further accurately derived, so the measurement accuracy of the voltage further improves.

Furthermore, the controller 91 derives a voltage drop ΔV in the external common lead 79 in accordance with the heater current Ih and the temperature T of the external common lead 79. As expressed by the expression (2) and the expression (3), the resistance value Re of the external common lead 79 also varies depending on the temperature T, and, therefore, the voltage drop ΔV also varies. Therefore, it is possible to further accurately derive a voltage drop ΔV by considering not only the heater current Ih but also the temperature T of the external common lead 79, so the measurement accuracy of the voltage further improves.

In addition, the gas sensor 100 includes the internal common lead 78 that serves as both at least part of an electric circuit used to acquire the voltage Vref by providing electrical continuity between the outer pump electrode 23 and the inter-electrode voltage acquisition section 85 and at least part of an electric circuit used to supply an electric power from the heater power supply 76 to the heater 72 and is disposed inside the sensor element 101. The gas sensor 100 includes a common terminal (here, connector electrode 71f) disposed outside the sensor element 101 and connected to the internal common lead 78, and the common terminal is a terminal used to connect the sensor element 101 to a device outside the sensor element 101. In this way, when the sensor element 101 includes the internal common lead 78 and the common terminal (here, connector electrode 71f), the number of the leads and connector electrodes 71 to be disposed on or in the sensor element 101 is reduced.

Of the outer pump electrode 23 and the reference electrode 42, the outer pump electrode 23 is provided on the sensor element 101 so as to contact with a measurement-object gas and the reference electrode 42 is disposed on or in the sensor element 101 so as to contact with a reference gas that is a reference for the reference electrode 42 to detect an oxygen concentration. By disposing the outer pump electrode 23 and the reference electrode 42 in this way, the voltage between the outer pump electrode 23 and the reference electrode 42 becomes a value based on a difference in oxygen concentration between the measurement-object gas and the reference gas, so it is possible to detect the oxygen concentration in the measurement-object gas in accordance with the voltage. Since the controller 91 detects the oxygen concentration in the measurement-object gas by using not the voltage Vref but the voltage Vrefc that is the corrected voltage Vref, the measurement accuracy of the oxygen concentration improves.

In addition, in the gas sensor 100, the oxygen concentration of a measurement-object gas introduced into the measurement-object gas flow portion is adjusted by the preliminary pump cell 15, the main pump cell 21, and the auxiliary pump cell 50, and the adjusted measurement-object gas reaches the third internal cavity 61 in which the measurement electrode 44 is disposed. The controller 91 acquires a detected value (here, pump current Ip2) corresponding to oxygen that is produced in the third internal cavity 61 from NOx in accordance with a voltage V2 that is a measurement voltage, more specifically, by executing feedback control based on the voltage V2, and detects a NOx concentration in the measurement-object gas in accordance with the acquired pump current Ip2. Therefore, in the gas sensor 100, a NOx concentration is detected in accordance with a pump current Ip2, and an oxygen concentration is detected in accordance with a voltage Vrefc, so both the NOx concentration and the oxygen concentration in a measurement-object gas are detected. The sensor element 101 includes the plurality of electrodes and the heater and needs a plurality of leads used to connect each of them to a device outside the sensor element, while it is possible to reduce the number of leads by providing part of electric circuits as the above-described external common lead 79. In addition, the sensor element 101 includes the internal common lead 78 and the connector electrode 71f that is a common terminal, so the number of the terminals (connector electrodes 71) of the sensor element 101 is reduced. When, for example, the internal common lead 78 and the common terminal are not provided, six terminals respectively for the electrodes 16, 22, 23, 42, 44, 51 and three terminals connected to the heater 72, that is, nine terminals in total, are needed; however, when the connector electrode 71f is provided as a common terminal, the number of terminals is reduced to eight. When the sensor element 101 includes a plurality of electrodes in this way, it is highly significant to reduce the number of terminals by providing a common terminal.

The present invention is not limited to the above-described embodiment and may be, of course, implemented in various modes within the technical scope of the present invention.

For example, in the above-described embodiment, the length L of the external common lead 79 is stored in the storage section 94, and the controller 91 derives a voltage drop ΔV by using the length L; however, the configuration is not limited thereto. For example, the value of the length L may be a temporary value different from an actual length of the external common lead 79. For example, the length of the external common lead 79 may not be determined until the gas sensor 100 is installed in a vehicle. In preparation for such cases, a temporary value determined as appropriate from among a range assumed as the length of the external common lead 79 may be stored in the storage section 94 as the value of the length L. In this case, the length of the actual external common lead 79 and the length L stored in the storage section 94 may deviate from each other; however, in this case as well, the effect of improving the measurement accuracy is somewhat obtained as compared to the case where no correction is made in accordance with a voltage drop ΔV. For example, a median value in a range assumed as the length of the external common lead 79 may be stored in the storage section 94 in advance as the length L.

In the above-described embodiment, in step S120, the controller 91 derives a temperature T by directly using the temperature detected by the temperature sensor 89 as the temperature T of the external common lead 79; however, the configuration is not limited thereto. For example, the controller 91 may store in advance the correspondence relation between a temperature T detected by the temperature sensor 89 and a temperature T of the external common lead 79 and derive the temperature T of the external common lead 79 in accordance with the temperature detected by the temperature sensor 89 and the correspondence relation stored in the storage section 94. In the above-described embodiment, the temperature sensor 89 is an outside air temperature sensor that measures an outside air temperature; however, the configuration is not limited thereto. For example, the temperature sensor 89 may be a sensor that measures the temperature of an engine compartment or a sensor that measures the temperature of the external common lead 79 or around the external common lead 79.

In the above-described embodiment, the controller 91 derives a voltage drop ΔV in accordance with the temperature T of the external common lead 79, derived in step S120; however, the configuration is not limited thereto. The controller 91 may derive a voltage drop ΔV on the assumption that the temperature T is a constant stored in the storage section 94 in advance or may derive a voltage drop ΔV on the assumption that the electric resistivity ρ of the external common lead 79 is not dependent on temperature and is constant (by extension, on the assumption that the resistance value Re is constant). When, for example, the external common lead 79 is a copper wire, the temperature coefficient α of copper is $4.4 \times 10^{-3}$[/° C.], so, even when the external common lead 79 rises in temperature from 0° C. to 60° C., the electric resistivity ρ increases to about 1.26 times (=$1+4.4\times10^{-3}\times60°$ C.), as is apparent from the expression (3). Therefore, even when a voltage drop ΔV is derived in accordance with a heater current Ih while ignoring a change in resistance value Re due to temperature T, that is, without deriving the current temperature T of the external common lead 79, the effect of improving the measurement accuracy is obtained as compared to the case where no correction is made at all in accordance with a voltage drop ΔV. When the temperature T is a constant, for example, a median value of a range estimated as the temperature of the external common lead 79 may be stored in the storage section 94 in advance as the temperature T or may be stored in the storage section 94 by setting an electric resistivity ρ or resistance value Re derived in accordance with such a constant temperature T as a constant in advance.

In the above-described embodiment, the heater current acquisition section 86 acquires a heater current Ih; however, the configuration is not limited thereto. For example, the controller 91 may derive a heater current Ih in accordance with the voltage of the heater 72 and the resistance value (or temperature) of the heater 72.

In the above-described embodiment, a voltage drop due to passage of the heater current Ih through the internal common lead 78 is ignored. Alternatively, the controller 91 may correct the voltage Vref by also using the value of a voltage drop in the internal common lead 78. Specifically, the controller 91 may derive a voltage Vrefc by subtracting not only a voltage drop ΔV but also the value of a voltage drop in the internal common lead 78 from a voltage Vref. The value of a voltage drop in the internal common lead 78 can be derived in accordance with a heater current Ih as in the case of the voltage drop ΔV. In this case, as in the case of the temperature T, electric resistivity ρ, electric resistivity ρ0 at 0° C., temperature coefficient α, length L, and cross-sectional area S of the external common lead 79, the temperature, electric resistivity, electric resistivity at 0° C., temperature coefficient, length, and cross-sectional area of the internal common lead 78 may be stored in the storage section 94 in advance. The controller 91 may derive the temperature of the internal common lead 78 in accordance with the temperature (or resistance value) of the heater 72.

In the above-described embodiment, in the heater control process, the heater power supply 76 adjusts an electric power to be supplied to the heater 72 by changing the value of a voltage applied to the heater 72; however, the configuration is not limited thereto. For example, the heater power supply 76 may adjust an electric power to be supplied to the heater 72 in accordance with a time during which a constant voltage is applied. In other words, an electric power may be adjusted in accordance with a duty ratio that is the percentage of the on duration of voltage in a predetermined period. Pulse width modulation (PWM) is usable for such control. In this case, the heater current Ih also repeats on/off states, so the voltage Vref also repeats on and off under the influence of a voltage drop ΔV accordingly. In such a case, when, for example, the inter-electrode voltage acquisition section 85 acquires the peak value of the voltage Vref, the controller 91 may calculate a voltage drop ΔV in accordance with the peak value of the heater current Ih and then correct the voltage Vref. When the inter-electrode voltage acquisition section 85 acquires the average value of the voltage Vref, the controller 91 may calculate a voltage drop ΔV in accordance with the average value of the heater current Ih and then correct the voltage Vref.

In the above-described embodiment, the CPU 92 derives a heater voltage Vh by using the relational expression Vh=Vh1−Vh2; however, the configuration is not limited thereto. For example, the first heater voltage acquisition section 87 may be connected to each of the connector electrode 71f and the connector electrode 71g by a lead, and the CPU 92 may calculate a heater voltage Vh by using the relational expression Vh=Vh1−2×Vh2.

In the above-described embodiment, the sensor element 101 includes the preliminary pump cell 15 including the preliminary pump electrode 16; however, the preliminary pump cell 15 may be omitted. When, for example, the measurement-object gas is an exhaust gas from a diesel engine, the measurement-object gas is almost constantly a lean atmosphere, so pumping of oxygen into the buffer space 12 by the preliminary pump cell 15 is not needed.

In the above-described embodiment, the external common lead 79 makes up at least part of an electric circuit used to acquire a voltage based on a difference in oxygen concentration between a measurement-object gas and a reference gas; however, the configuration is not limited thereto. As long as the external common lead 79 makes up at least part of an electric circuit used to measure the voltage between any two electrodes, the measurement accuracy of the voltage decreases under the influence of a voltage drop due to passage of a heater current Ih through the external common lead 79, so the effect of improving the measurement accuracy is obtained by making a correction as in the case of the above-described embodiment.

Figure 7:
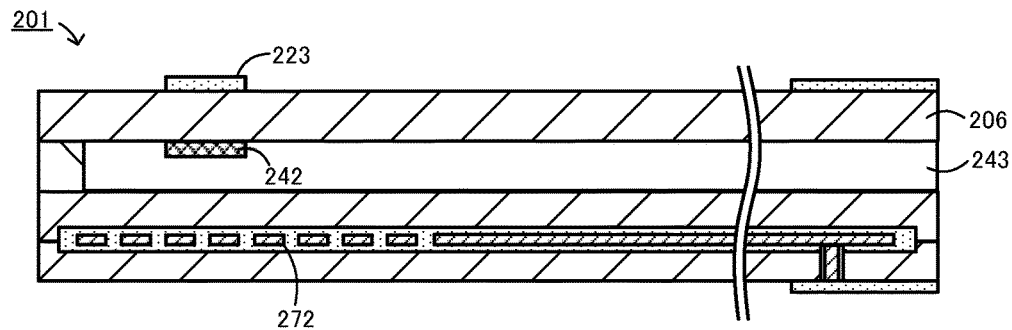
FIG. 7 is a schematic cross-sectional view of a sensor element 201 of a modification.

In the above-described embodiment, the gas sensor 100 detects a NOx concentration and an oxygen concentration in a measurement-object gas. Alternatively, the gas sensor 100 may be a sensor that detects only an oxygen concentration. FIG. 7 is a schematic cross-sectional view of a sensor element 201 of a modification. The sensor element 201 includes a solid electrolyte layer 206, an outer electrode 223, a reference electrode 242, and a heater 272. The outer electrode 223 is disposed on the top surface of the solid electrolyte layer 206 outside the sensor element 201. The reference electrode 242 is disposed on the under surface of the solid electrolyte layer 206 and is exposed in a reference gas inlet space 243 inside the sensor element 201. In the sensor element 201, an electrochemical sensor cell is made up of the outer electrode 223, the solid electrolyte layer 206, and the reference electrode 242. Therefore, with a gas sensor including the sensor element 201, it is possible to detect an oxygen concentration in a measurement-object gas around the outer electrode 223 by acquiring a voltage generated between the outer electrode 223 and the reference electrode 242. In this case as well, as in the case of the above-described embodiment, it is possible to improve the detection accuracy of the oxygen concentration in a measurement-object gas by making a correction based on a heater current of the heater 272 while reducing the number of leads by providing the external common lead 79.

In the above-described embodiment, the CPU 92 executes a process of feedback control over the voltage Vp2 of the variable power supply 46 such that the voltage V2 becomes a target value V2* and detects a NOx concentration in a measurement-object gas in accordance with a detected value (pump current Ip2) at this time; however, the configuration is not limited thereto. For example, the CPU 92 may control the measurement pump cell 41 (control, for example, the voltage Vp2) such that the pump current Ip2 becomes a constant target value Ip2* and detect a NOx concentration by using a detected value (voltage V2) at this time. When the measurement pump cell 41 is controlled such that the pump current Ip2 becomes a target value Ip2*, oxygen is pumped out from the third internal cavity 61 at a substantially constant flow rate. Therefore, the oxygen concentration in the third internal cavity 61 varies with the amount of oxygen developed as a result of reduction of NOx in a measurement-object gas in the third internal cavity 61, with the result that the voltage V2 varies. Therefore, the voltage V2 becomes a value corresponding to a NOx concentration in the measurement-object gas. Therefore, it is possible to calculate a NOx concentration in accordance with the voltage V2. For example, the correspondence relation between a voltage V2 and a NOx concentration may be stored in the storage section 94 in advance.

In the above-described embodiment, the gas sensor 100 detects a NOx concentration as a specific gas concentration; however, the configuration is not limited thereto. Another oxide concentration may be used as a specific gas concentration. When the specific gas is an oxide, oxygen is produced when the specific gas itself is reduced in the third internal cavity 61 as in the case of the above-described embodiment, so the CPU 92 is able to detect a specific gas concentration by acquiring a detected value corresponding to the oxygen. Alternatively, the specific gas may be a non-oxide, such as ammonia. When the specific gas is a non-oxide, oxygen is produced when the specific gas converted to an oxide (in the case of, for example, ammonia, converted to NO) is reduced in the third internal cavity 61, so the CPU 92 is able to detect a specific gas concentration by acquiring a detected value corresponding to the oxygen. When, for example, the preliminary pump electrode 16 contains a metal having a catalytic function that promotes the oxidation of ammonia, it is possible to convert the specific gas into an oxide in the buffer space 12 by the catalytic function of the preliminary pump electrode 16. A similar function is possible in the inner pump electrode 22. Since ammonia is converted to NO as an oxide, measurement of an ammonia concentration is basically performed under the same principle as NOx concentration.

Figure 8:
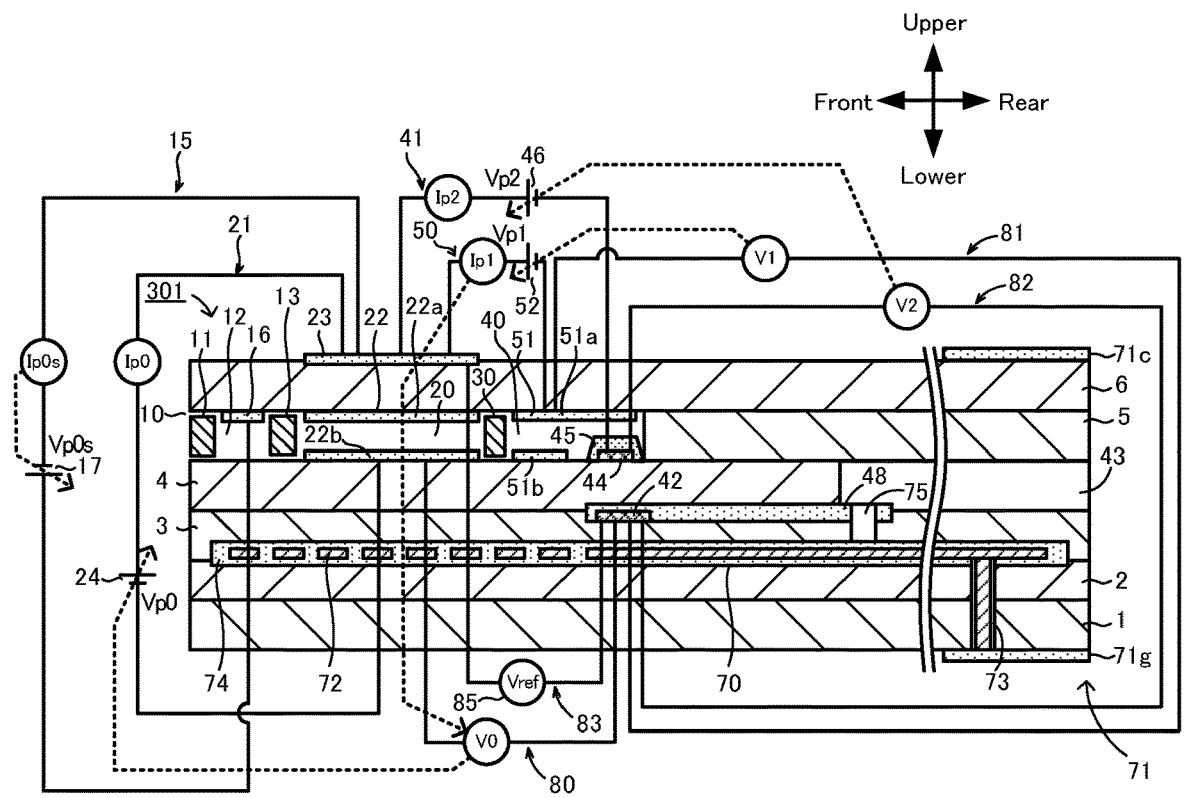
FIG. 8 is a schematic cross-sectional view of a sensor element 301 of a modification.

In the above-described embodiment, the sensor element 101 of the gas sensor 100 includes the first internal cavity 20, the second internal cavity 40, and the third internal cavity 61; however, the configuration is not limited thereto. For example, as in the case of a sensor element 301 of FIG. 8, the third internal cavity 61 may be omitted. In the sensor element 301 of a modification shown in FIG. 8, the gas inlet port 10, the first diffusion controlled portion 11, the buffer space 12, the second diffusion controlled portion 13, the first internal cavity 20, the third diffusion controlled portion 30, and the second internal cavity 40 are formed adjacent to each other in this order between the under surface of the second solid electrolyte layer 6 and the top surface of the first solid electrolyte layer 4 so as to communicate with each other. The measurement electrode 44 is disposed on the top surface of the first solid electrolyte layer 4 in the second internal cavity 40. The measurement electrode 44 is coated with a fourth diffusion controlled portion 45. The fourth diffusion controlled portion 45 is a film made up of a ceramic porous material, such as alumina ($Al_2O_3$). The fourth diffusion controlled portion 45, as well as the fourth diffusion controlled portion 60 of the above-described embodiment, plays a role in limiting the amount of NOx flowing into the measurement electrode 44. The fourth diffusion controlled portion 45 also functions as a protection film for the measurement electrode 44. The ceiling electrode portion 51a of the auxiliary pump electrode 51 is formed up to just above the measurement electrode 44. With the thus configured sensor element 301 as well, it is possible to detect a NOx concentration in accordance with, for example, a pump current Ip2 as in the case of the above-described embodiment. In this case, the surroundings of the measurement electrode 44 function as a measurement chamber.

In the above-described embodiment, the element body of the sensor element 101 is a layered body including a plurality of solid electrolyte layers (layers 1 to 6); however, the configuration is not limited thereto. The element body of the sensor element 101 may include at least one oxygen-ion-conductive solid electrolyte layer and include a measurement-object gas flow portion inside. For example, the layers 1 to 5 other than the second solid electrolyte layer 6 in FIG. 1 may be a structural layer made of a material other than a solid electrolyte (for example, a layer made of alumina). In this case, the electrodes of the sensor element 101 just need to be disposed on the second solid electrolyte layer 6. For example, the measurement electrode 44 of FIG. 1 just needs to be disposed on the under surface of the second solid electrolyte layer 6. The reference gas inlet space 43 may be provided in the spacer layer 5 instead of the first solid electrolyte layer 4, the atmosphere inlet layer 48 may be provided between the second solid electrolyte layer 6 and the spacer layer 5 instead of being provided between the first solid electrolyte layer 4 and the third substrate layer 3, and the reference electrode 42 may be provided on the rear side with respect to the third internal cavity 61 on the under surface of the second solid electrolyte layer 6.

In the above-described embodiment, the controller 91 sets (executes feedback control over) the target value V0* of the voltage V0 such that the pump current Ip1 becomes a target value Ip1* and executes feedback control over the pump voltage Vp0 such that the voltage V0 becomes a target value V0*; however, another control may be employed. For example, the controller 91 may execute feedback control over the pump voltage Vp0 in accordance with the pump current Ip1 such that the pump current Ip1 becomes a target value Ip1*. In other words, the controller 91 may directly control the pump voltage Vp0 (by extension, control the pump current Ip0) in accordance with the pump current Ip1 by omitting acquisition of the voltage V0 from the main pump control oxygen partial pressure detection sensor cell 80 and setting of the target value V0*.

What is claimed is:
1. A gas sensor comprising:
a sensor element including an element body having an oxygen-ion-conductive solid electrolyte layer, a first electrode disposed on or in the element body, a second electrode disposed on or in the element body, and a heater disposed on or in the element body;
a voltage acquisition section that acquires a voltage between the first electrode and the second electrode;
a heater power supply that supplies an electric power to the heater;
an external common lead that serves as both at least part of an electric circuit used to acquire the voltage by providing electrical continuity between the first electrode and the voltage acquisition section and at least part of the electric circuit used to supply an electric power from the heater power supply to the heater and that is disposed outside the sensor element; and
a correction section that derives a value of a voltage drop in the external common lead in accordance with a heater current flowing through the heater and that corrects the voltage acquired by the voltage acquisition section in accordance with the derived value of the voltage drop.

2. The gas sensor according to claim 1, wherein the correction section derives the value of the voltage drop in the external common lead in accordance with the heater current flowing through the heater, and a length of the external common lead.

3. The gas sensor according to claim 1, wherein the correction section derives the value of the voltage drop in the external common lead in accordance with the heater current flowing through the heater, and a temperature of the external common lead.

4. The gas sensor according to claim 1, further comprising:
an internal common lead that serves as both at least part of the electric circuit used to acquire the voltage by providing electrical continuity between the first electrode and the voltage acquisition section and at least part of the electric circuit used to supply the electric power from the heater power supply to the heater and that is disposed inside the sensor element; and
a common terminal disposed outside the element body and connected to the internal common lead, the common terminal being a terminal for connecting the sensor element to a device outside the sensor element.

5. The gas sensor according to claim 1, wherein one of the first electrode or the second electrode is disposed on or in the element body so as to contact with a measurement-object gas and the other one of the first electrode or the second electrode is disposed on or in the element body so as to contact with a reference gas that is a reference for detecting an oxygen concentration, and
the gas sensor further comprises an oxygen concentration detection section that detects an oxygen concentration in the measurement-object gas in accordance with the voltage corrected by the correction section.

6. The gas sensor according to claim 5, wherein
a measurement-object gas flow portion that introduces the measurement-object gas into the element body and flows the measurement-object gas is provided inside the element body,
the first electrode is an outer electrode provided outside the element body,
the second electrode is a reference electrode provided inside the element body,
the sensor element includes a preliminary pump electrode, a main pump electrode, and an auxiliary pump electrode disposed in this order from an upstream side in the measurement-object gas flow portion, a measurement electrode disposed in a measurement chamber provided downstream of the auxiliary pump electrode within the measurement-object gas flow portion, and a reference gas inlet portion that introduces the reference gas and flows the reference gas to the reference electrode, and
the gas sensor further comprises:
an oxygen concentration adjustment section that adjusts the oxygen concentration in the measurement-object gas flow portion by applying a control voltage between the preliminary pump electrode and the outer electrode, between the main pump electrode and the outer electrode, and between the auxiliary pump electrode and the outer electrode, respectively;
a measurement voltage detection section that detects a measurement voltage between the reference electrode and the measurement electrode; and
a specific gas concentration detection section that acquires a detected value corresponding to oxygen produced from a specific gas in the measurement-object gas in the measurement chamber in accordance with the measurement voltage and detects a specific gas concentration in the measurement-object gas in accordance with the detected value.

* * * * *